(12) United States Patent
Guha et al.

(10) Patent No.: US 11,787,087 B2
(45) Date of Patent: Oct. 17, 2023

(54) THREE DIMENSIONAL PREFORM CREATED BY PRECONSOLIDATION OF THERMAL PLASTIC STITCHED SHEET

(71) Applicant: COATS & CLARK, INC., Charlotte, NC (US)

(72) Inventors: Probir Kumar Guha, Charlotte, NC (US); George Han, Charlotte, NC (US)

(73) Assignee: J. & P. Coats Limited, Uxbridge (GB)

( * ) Notice: Subject to any disclaimer, the term of this patent is extended or adjusted under 35 U.S.C. 154(b) by 61 days.

(21) Appl. No.: 17/210,802

(22) Filed: Mar. 24, 2021

(65) Prior Publication Data

US 2022/0305693 A1 Sep. 29, 2022

(51) Int. Cl.
*B29B 11/00* (2006.01)
*B29B 11/16* (2006.01)
*B29B 11/04* (2006.01)
*B29K 81/00* (2006.01)
*B29K 309/08* (2006.01)
*B29K 1/00* (2006.01)
*B29K 307/04* (2006.01)

(52) U.S. Cl.
CPC .............. *B29B 11/16* (2013.01); *B29B 11/04* (2013.01); *B29K 2001/08* (2013.01); *B29K 2081/06* (2013.01); *B29K 2307/04* (2013.01); *B29K 2309/08* (2013.01)

(58) Field of Classification Search
CPC ......... B29B 11/00; B29B 11/04; B29B 11/10; B29B 11/16
See application file for complete search history.

(56) References Cited

U.S. PATENT DOCUMENTS

| | | | |
|---|---|---|---|
| 2009/0050259 A1* | 2/2009 | Joern | B32B 27/08 156/181 |
| 2019/0217556 A1* | 7/2019 | Bheda | B29C 70/24 |
| 2020/0049283 A1* | 2/2020 | Chase | B29B 11/16 |

* cited by examiner

*Primary Examiner* — Jacob T Minskey
*Assistant Examiner* — Matthew Hoover
(74) *Attorney, Agent, or Firm* — MaxGoLaw PLLC

(57) ABSTRACT

A two dimensional unitary preform sheet including a substrate and a fiber bundle arranged on the substrate and attached to the substrate by a plurality of stitches of a thread, which may be a thermoplastic thread. The two dimensional unitary preform sheet is configurable into a three dimensional preform. According to embodiments, the fiber bundle includes carbon fibers, glass fibers, aramid fibers, or a combination thereof. According to embodiments, the two dimensional unitary preform sheet is cut in a pattern that is foldable into the three dimensional preform. A method for making a three dimensional preform is also provided, which includes forming a two dimensional unitary preform sheet and placing the two dimensional unitary preform in a press to bend the two dimensional unitary preform into the shape of the three dimensional preform.

14 Claims, 10 Drawing Sheets

THREE DIMENSIONAL PREFORM CREATED BY PRECONSOLIDATION OF THERMAL PLASTIC STITCHED SHEET

The present invention generally relates to a composite material suitable for forming light-weight, high-strength vehicle components, and more particularly to a unitary three dimensional sewn reinforced composite preform, and a method of construction thereof based on thermoset resin overmolding of the preform.

BACKGROUND

Weight savings in the automotive, transportation, and logistics based industries has been a major focus in order to make more fuel-efficient vehicles both for ground and air transport. In order to achieve these weight savings, light weight composite materials have been introduced to take the place of metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for many reasons: common examples include materials which are stronger, lighter, or less expensive when compared to traditional materials.

There are two categories of constituent materials: matrix and reinforcement. At least one portion of each type is required. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination.

Commercially produced composites often use a polymer matrix material that is either a thermoplastic or thermoset resin. There are many different polymers available depending upon the starting raw ingredients which may be placed into several broad categories, each with numerous variations. Examples of the most common categories for categorizing polymers include polyester, vinyl ester, epoxy, phenolic, polyimide, polyamide, polypropylene, PEEK, and others.

The use of fiber and particulate inclusions to strengthen a matrix is well known to the art. Well established mechanisms for the strengthening include slowing and elongating the path of crack propagation through the matrix, as well as energy distribution associated with pulling a fiber free from the surrounding matrix material. In the context of sheet molding composition (SMC) formulations, bulk molding composition (BMC) formulations, and resin transfer molding (RTM); hereafter referred to collectively as "molding compositions", fiber strengthening has traditionally involved usage of chopped glass fibers. There is a growing appreciation in the field of molding compositions that replacing in part, or all of the glass fiber in molding compositions with carbon fiber can provide improved component properties.

The use of carbon fibers in composites, sheet molding compositions, and resin transfer molding (RTM) results in formed components with a lower weight as compared to glass fiber reinforced materials. The weight savings achieved with carbon fiber reinforcement stems from the fact that carbon has a lower density than glass and produces stronger and stiffer parts at a given thickness.

Fiber-reinforced composite materials can be divided into two main categories normally referred to as short fiber-reinforced materials and continuous fiber-reinforced materials. Continuous reinforced materials often constitute a layered or laminated structure. The woven and continuous fiber styles are typically available in a variety of forms, being pre-impregnated with the given matrix (resin), dry, uni-directional tapes of various widths, plain weave, harness satins, braided, and stitched. Various methods have been developed to reduce the resin content of the composite material, by increasing the fiber content. Typically, composite materials may have a ratio that ranges from 60% resin and 40% fiber to a composite with 40% resin and 60% fiber content. The strength of a product formed with composites is greatly dependent on the ratio of resin to reinforcement material.

FIG. 1 illustrates a prior art method for creating a reinforcement preform is to arrange a fibrous material on another piece of base material and to fix the fibrous material with an upper and lower stitching thread on the base material. The fiber material can be placed in curvilinear patterns of a multitude of shapes upon the base material. Layers of the fiber material may be built up to produce a two-dimensional fiber preform insert, which may be impregnated with a molding resin. In forming such composite materials, resin is forced into the fiber preform by an overmolding process such as resin transfer molding (RTM) or liquid composite molding (LCM).

As shown in FIG. 1, a fiber preform 10 includes a first preform layer 11 having a substrate 12 which acts as a foundation or base upon with a fiber bundle 14 is applied. The substrate 12 may be a tear-off fabric or paper or other suitable material. The fiber bundle 14 is applied to the substrate 12 by a selective comingled fiber bundle positioning (SCFBP) or tailored fiber placement (TFP) method and attached to the substrate 12 by a plurality of stitches 18 of a thread. The fiber preform 10 further includes a plurality of secondary tackpoints 17 throughout the fiber bundle 14. The secondary tackpoints further attach the fiber bundle 14 to the substrate 12, attach the fiber bundle 14 to itself, or a combination thereof.

The fiber bundle 14 may be applied in any arrangement on the substrate 12. The arrangement of the fiber bundle 14 on the substrate 12 may generally resemble the shape of the designed final composite material component, for example a structural component of an automobile. According to various embodiments, the fiber bundle 14 is arranged on the substrate 12 in a curvilinear pattern. The fiber bundle 14 may be arranged in a principal direction, i.e. a principal direction of stress of the final composite material component. FIG. 1 illustrates only a first preform layer 11.

The fiber bundle 14 is made of reinforcing fibers, such as those made of carbon, glass, or aramid fibers, thermoplastic fibers, or a comingled reinforcing fibers and thermoplastic fibers which serve to provide a matrix in a composite material made of both reinforcing and matrix fibers. The matrix fibers, being of a thermofusible nature may be formed from a thermoplastic material such as, for example, polypropylenes, polyamides, polyesters, polyether ether ketones, polybenzobisoxazoles, polyphenylene sulfide; block copolymers containing at least of one of the aforementioned constituting at least 40 percent by weight of the copolymer; and blends thereof. The thermoplastic fibers are appreciated to be recycled, virgin, or a blend thereof. The thermofusible thermoplastic matrix fibers have a first melting temperature at which point the solid thermoplastic material melts to a liquid state. The reinforcing fibers may also be of a material that is thermofusible provided their thermofusion occurs at a temperature which is higher than the first melting temperature of the matrix fibers so that, when both fibers are used to create composite, at the first melting temperature at which thermofusibility of the matrix fibers occurs, the state of the reinforcing fibers is unaffected.

The thread for attaching the fiber bundle 14 to the substrate 12 is a thermoplastic thread. The thermoplastic thread may be a nylon or polyethylene material. The identity of the thermoplastic thread may be selected to have a melting temperature that is lower than the melting temperature of the thermoplastic fibers of the fiber bundle 14. At this lower second melting temperature, the solid thermoplastic thread melts to a liquid state. At this lower melting temperature, thermofusibility of only the thermoplastic thread occurs, while the state of the thermoplastic fibers of the fiber bundle is unaffected. The melting temperature differential between the melting temperature of the thermoplastic fiber of the fiber bundle (first melting temperature) and the melting temperature of the thermoplastic thread (second melting temperature) may be at least 50° C., or the melting temperature differential may be more than 100° C.

As shown in FIG. 1, the plurality of stitches 18 are shown in various stitch arrangements and combinations. The plurality of stitches 18 includes only as many stitches 10 as is necessary to secure the fiber bundle 14 to the substrate 12. For example, the number of stitches necessary to secure the fiber bundle 14 to the substrate 12 will depend in part on the arrangement of the fiber bundle 14 on the substrate 12 and the size of the fiber preform 10. Generally, the number of stitches 18 necessary to secure the fiber bundle 14 to the substrate means the stitches 18 are capable of holding the fiber bundle generally or approximately in its arranged position relative to the substrate 12. For example, the stitches may be discrete stitches 18a, 18b, 18c positioned long the length of the fiber bundle 14, or the stitches may be continuous stitches 18d. Generally, the goal of the stitches 18 is to secure the fiber bundle to the substrate with as few stitches as possible, thereby speeding the manufacturing time and increasing throughput of the fiber preform 10. For example, the stitches 18a may be located at the ends of the fiber bundle 14. Alternatively, or in combination, the stitches 18b may be located at positioned where the fiber bundle 14 changes direction in its arrangement on the substrate 12; for example, at the curves or bends in the fiber bundle. Alternatively, or in combination, the stitches 18c may be located in linear portions of the fiber bundle. The plurality of stitches of thread may also attach the fiber bundle to itself. The tension of the plurality of stitches may also be controlled. For example, low tension stitches results in a lose attachment of the fiber bundle to the substrate and more thread material in the fiber preform. Alternatively, high tension stitches result in a tight attachment between the fiber bundle and the substrate, an ability to put the fiber bundle in compression, and less thread material in the fiber preform.

The plurality of secondary tackpoints 17 throughout the fiber bundle 14 further attach the fiber bundle 14 to the substrate 12, attach the fiber bundle 14 to itself, or a combination thereof. The plurality of secondary tack points 17 are configurations of hot glue, sprayed on adhesive, fused points formed by ultrasonic welding, fused points formed by melting of the thermoplastic thread. In embodiments in which the secondary tack points 17 are formed by melting the thermoplastic thread, the thermoplastic thread is melted by heating the fiber preform 10 to the melting temperature of the thermoplastic thread to fuse stitches of the thermoplastic thread to other stitches of the thermoplastic thread. Alternatively, the thermoplastic thread may be melted and fused by spot ironing or flat ironing the fiber preform 10. A thermoplastic powder may be applied to the fiber bundle before or after the fiber bundle 14 is arranged on the substrate 12. The thermoplastic powder melts when heated and cures to form the plurality of secondary tack points. The plurality of secondary tack points 17 assist with speeding up the manufacturing process for such a fiber preform 10 by providing strength and stability to the preform 10 while allowing the number of stitches 18 to be reduced.

As shown in prior art FIG. 2, the fiber preform 10 includes the first preform layer 11 and at least one subsequent preform layer 20 formed of the fiber bundle 14 arranged upon the first preform layer 11. The plurality of secondary tack points 17 are in part positioned between the first preform layer 11 and the at least one subsequent preform layer 20. Each subsequent preform layer 20 is arranged on a preceding preform layer and attached to the preceding preform layer by additional stitches of the thread, by additional secondary tack points, or a combination thereof. While the example fiber preform 10 shown in FIG. 2 includes four subsequent preform layers for a total of five preform layers including the first preform layer, it is appreciated that the at least one subsequent preform layers may include two to twenty layers. The fiber bundle 14 that forms each of the subsequent preform layers may be a continuation of the fiber bundle of the preceding preform layer or it could be a separate piece of fiber bundle.

In FIG. 2, the plurality of stitches of thread are not shown for the sake of clarity, but it will be readily understood that each layer of fiber bundle 14 is attached to the preceding layer and/or to itself by a plurality of stitches identical to those explained throughout the present disclosure. Additionally, each layer of fiber bundle 14 may also be attached to the preceding layer and/or itself by secondary tack points.

As shown in FIG. 2, the orientation of each subsequent preform layer 20 may be offset from the orientation of the preceding preform layer. Offsetting the orientation of the various layers enables strength in multiple directions.

Unfortunately, when a composite material mold includes three-dimensional geometry such as a corner, it is difficult to ensure proper placement and fit of the preform material in the mold. Layers of a preform material can be laid up by hand to attempt to properly fit the preform into a mold having corners or inflection points, however, this process is slow and prone to operator error and tends to be unfavorable in terms of production cost, increased scrappage, and diminished throughput.

Thus, there exists a need for preforms for composite materials that include three-dimensional geometries that offer the benefits of placed fiber preforms, but have improved production throughput.

SUMMARY OF THE INVENTION

The present invention provides a two dimensional unitary preform sheet including a substrate and a fiber bundle arranged on the substrate and attached to the substrate by a plurality of stitches of a thread, which according to embodiments is a thermoplastic thread. The two dimensional unitary preform sheet is configurable into a three dimensional preform. According to embodiments, the fiber bundle is arranged on and attached to the substrate using selective comingled fiber bundle positioning (SCFBP) or tailored fiber placement (TFP). According to embodiments, the fiber bundle includes carbon fibers, glass fibers, aramid fibers, or a combination thereof. According to embodiments, the two dimensional unitary preform sheet is cut in a pattern that is foldable into the three dimensional preform.

The present invention also provides a method for making a three dimensional preform that includes forming the two dimensional unitary preform sheet described above and placing the two dimensional unitary preform in a press to bend the two dimensional unitary preform into the shape of the three dimensional preform. According to embodiments, the method also includes providing indicia on the two dimensional unitary preform sheet and/or cutting the two dimensional unitary preform sheet in a pattern that is foldable into the three dimensional preform.

BRIEF DESCRIPTION OF THE DRAWINGS

The present invention is further detailed with respect to the following drawings that are intended to show certain aspects of the present of invention, but should not be construed as limit on the practice of the invention, wherein.

DETAILED DESCRIPTION OF THE INVENTION

Figure 1:
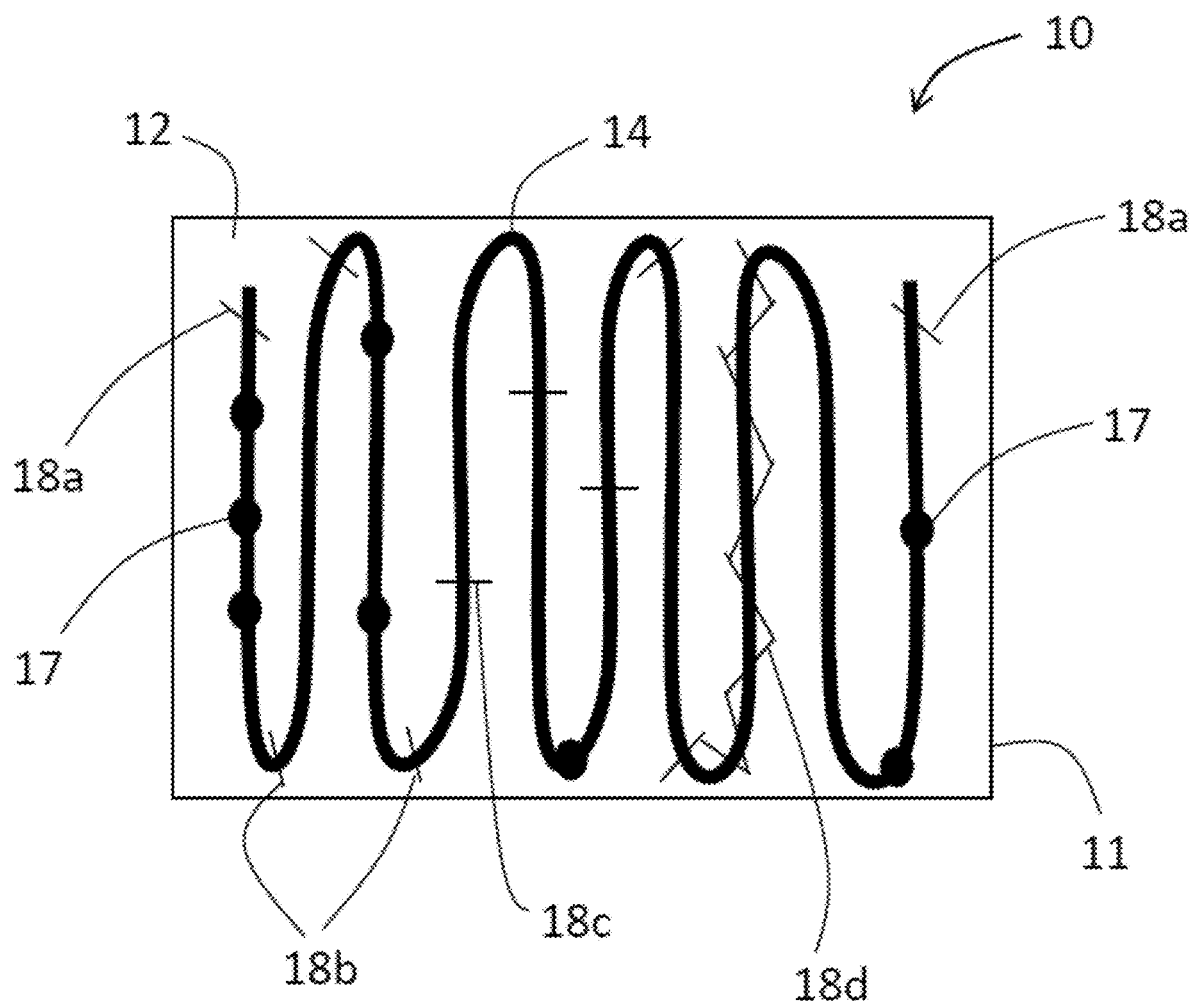
FIG. 1 is a prior art schematic view of a fiber bundle stitched to a substrate forming a fiber preform.
Figure 2:
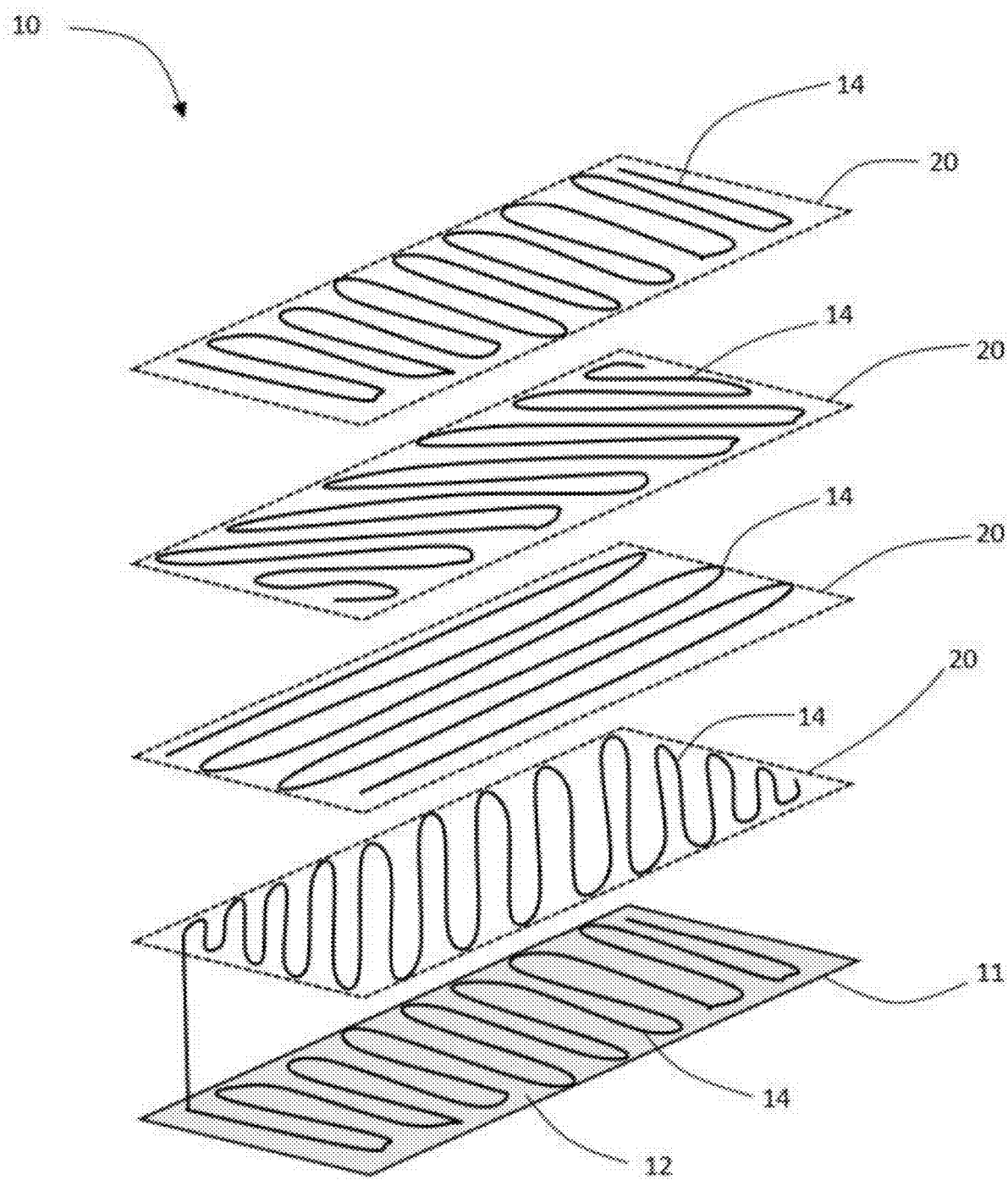
FIG. 2 is a prior art exploded perspective view a multi-layered fiber preform.

The present invention has utility as a unitary two dimensional preform sheet that may be folded into a three dimensional preform for forming composite components suitable for light-weight, high-strength vehicle components and a method for making the same. Embodiments of the two dimensional unitary preform sheet may be cut in a pattern that is foldable into a three dimensional preform. The shaping of the two dimensional fiber preform as a unitary piece that transforms into a three dimensional preform that generally corresponds to the shape of the composite material component prior to insertion in a mold results in a vehicle component with high quality and throughput while reducing product waste and human error. The unitary design of the two dimensional preform eliminates the need for placement of separate layup sheets in a press to form a three dimensional mold. The traditional placement of separate preform pieces to form a three dimensional preform is time consuming and error prone. Furthermore, embodiments of the unitary two dimensional preform sheet eliminate problems associated with stretching fibers at right angle corners when a composite material mold includes a three-dimensional geometry such as a corner, and eliminates the need to lay up by hand to attempt to properly fit the preform into a mold having corners or inflection points.

Embodiments of the unitary two dimensional preform sheet may be made up of from two or more sheets of multiple plys of carbon fibers up to ten plys. The carbon fibers may be laid out with over stitching being varied between layers. The use of a single preform allows for a lighter composite part with better overmolding, resin transfer molding (RTM), or liquid composite molding (LCM).

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, any reference to weight percent or by extension molecular weight of a polymer is based on weight average molecular weight.

As used herein, the term melting as used with respect to thermoplastic thread is intended to encompass both thermofusion of threads such that a vestigial core structure of separate fibers is retained, as well as a complete melting of the threads.

The thermoplastic thread is appreciated to be recycled, virgin, or a blend thereof.

Embodiments of the unitary two dimensional fiber preform sheets are at least partially impregnated with a thermoset resin. According to some embodiments, the unitary two dimensional fiber preform includes a substrate which acts as a foundation or base upon which a fiber bundle is applied. The substrate may be a tear-off fabric or paper or other suitable material. The fiber bundle is applied and attached to the substrate by a plurality of stitches of a thread, which according to some embodiments is a thermoplastic thread and in other embodiments is a thermoset material such as cellulose fibers, alkylated cellulose fibers, polyethersulphone, and rayon.

The fiber bundle is made of reinforcing fibers, such as those made of 100% carbon, 100% glass, or 100% aramid fibers, or a combination thereof. According to certain embodiments, the fiber bundle includes matrix fibers in addition to the reinforcing fibers. The matrix fibers being of a thermofusible nature may be formed from a thermoplastic material such as, for example, polypropylenes, polyamides, polyesters, polyether ether ketones, polybenzobisoxazoles, polyphenylene sulfide; block copolymers containing at least of one of the aforementioned constituting at least 40 percent by weight of the copolymer; and blends thereof. The thermoplastic fibers are appreciated to be recycled, virgin, or a blend thereof. The thermofusible thermoplastic matrix fibers have a first melting temperature at which point the solid thermoplastic material melts to a liquid state. The reinforcing fibers may also be of a material that is thermofusible provided their thermofusion occurs at a temperature which is higher than the first melting temperature of the matrix fibers so that, when both fibers are used to create a composite, at the first melting temperature at which thermofusibility of the matrix fibers occurs, the state of the reinforcing fibers is unaffected.

The fiber bundle may be applied in any arrangement on the substrate. The arrangement of the fiber bundle on the substrate may generally resemble the shape of the designed final composite material component, for example a structural component of an automobile. The fiber bundle may be arranged in a principal direction, i.e. a principal direction of stress of the final composite material component.

The fiber bundle is attached to the substrate by a plurality of stitches of thread. In some embodiments, the thread is a thermoplastic thread, such as nylon. The plurality of stitches may be in various zig-zag stitch arrangements. For example, the stitches may be closely spaced stitches or spaced apart by a greater linear distance such as stitches. The stitches may be continuously connected along the fiber bundle such as stitches, or the stitches may be discrete and separate single stitches, or separate groups of stitches such as stitches. The plurality of stitches of thread may also attach the fiber bundle to itself.

According to some embodiments of the unitary two dimensional preform sheet may include a plurality of subsequent preform layers formed of the fiber bundle successively stacked from the first preform layer. Each subsequent preform layer is arranged on a preceding preform layer and attached to the preceding preform layer by additional stitches of the thread. The fiber bundle that forms each of the subsequent preform layers may be a continuation of the fiber bundle of the preceding preform layer or it could be a separate piece of fiber bundle.

The details of forming such a preform are detailed in provisional applications 62/486,288 entitled "VEHICLE COMPONENT BASED ON SELECTIVE COMINGLED FIBER BUNDLE POSITIONING FORM," 62/486,368 entitled "VEHICLE COMPONENT BASED ON SELECTIVE COMINGLED FIBER BUNDLE POSITIONING PREFORM CURED IN A THERMOSET RESIN MATRIX," and 62/486,166 entitled "FIBER PREFORM AND METHOD OF MAKING THE SAME."

As described above, the unitary two dimensional preform sheet is at least partially impregnated with a thermoset resin. According to the present disclosure, the thermoset resin is applied to the unitary two dimensional preform sheet as a thermoset resin, for example a sheet molding compound (SMC). According to various embodiments, the preformed sheet of thermoset resin contains a matrix of polyester material combined with reinforcing fibers. In various embodiments, the sheet molding compound contains chopped fibers for reinforcement. For example, such chopped fibers illustratively include natural, glass, aramid, carbon (high strength and high modulus) and ceramic fibers.

Figure 3:
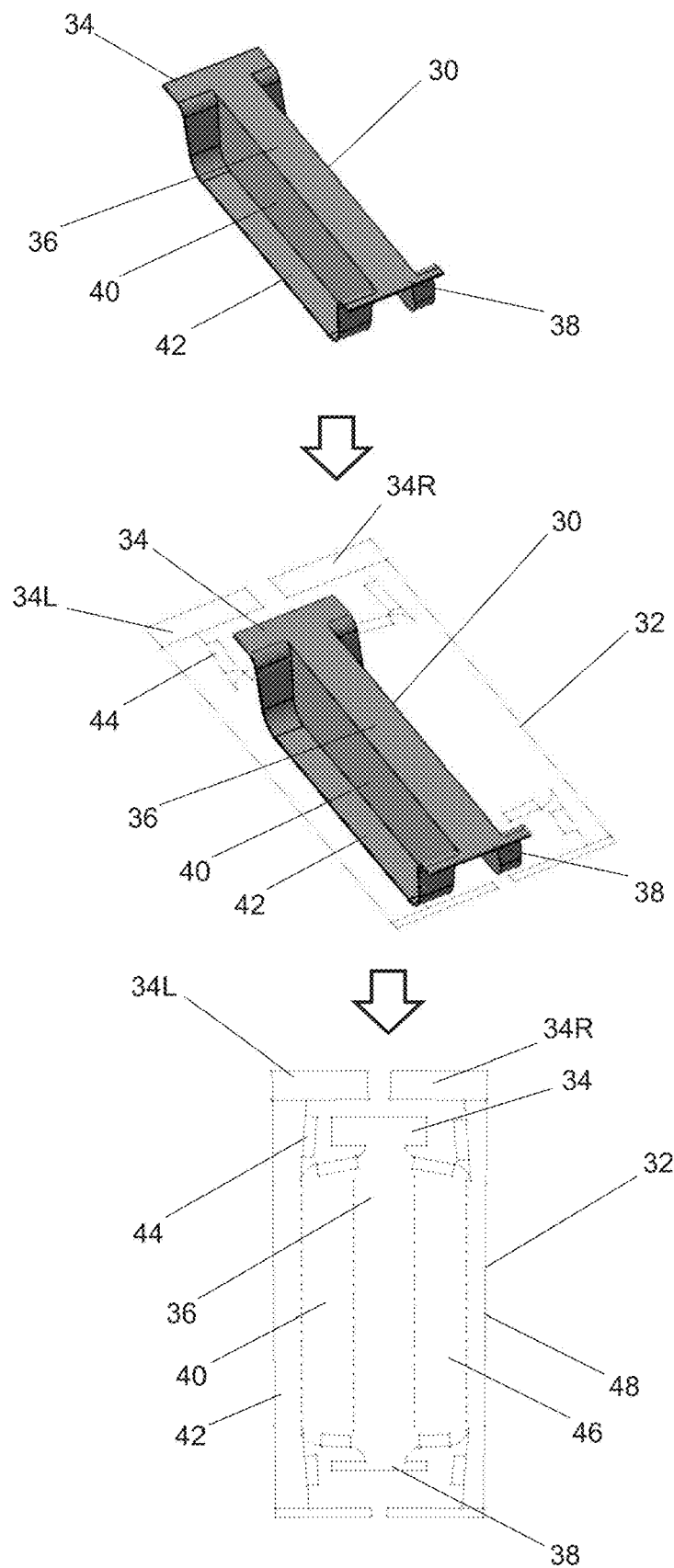
FIG. 3 illustrates the backward progression from a three dimensional preform to a two dimensional unitary preform sheet in accordance with embodiments of the present invention.

Referring now to the figures, FIG. 3 illustrates the backward progression from a three dimensional preform 30 to a two dimensional unitary preform sheet 32. The form of the three dimensional preform 30 corresponds to the shape of a composite part that will be formed in an overmolding process, in an RTM process, or liquid composite molding (LCM) process. A computer program may be used to determine a corresponding two dimensional unitary preform sheet 32 that when placed in a mold will provide the required three dimensional shape. Corresponding features or areas of the preform are labeled with like numbers to indicate where a feature of the three dimensional preform 30 is found on the two dimensional unitary preform sheet 32. The dotted lines represent major fold lines.

Figure 4:
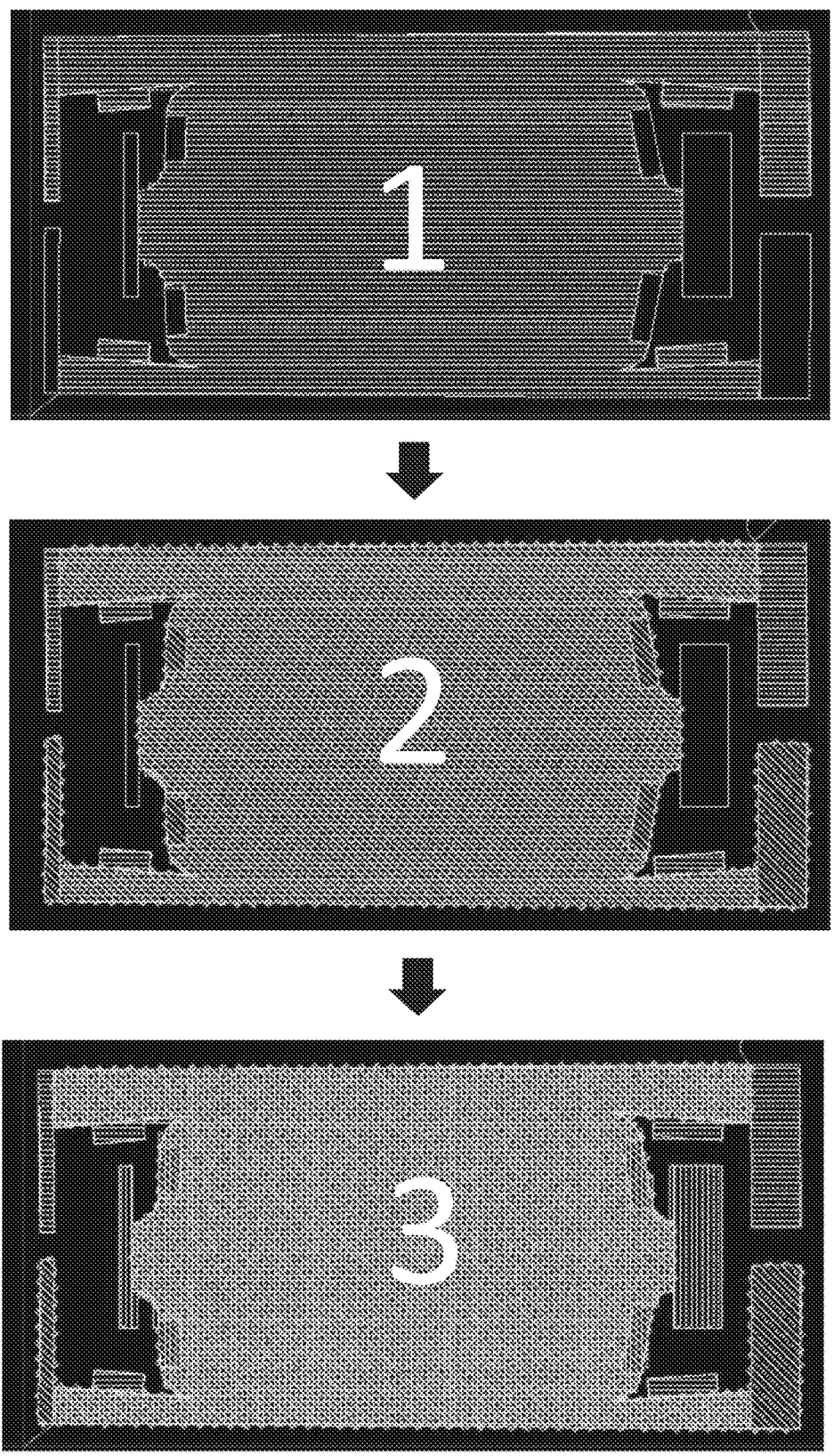
FIG. 4 illustrates three layers that form an embodiment of the two dimensional unitary preform sheet that is convertible into a three dimensional preform in accordance with embodiments of the invention.

FIG. 4 illustrates three layers of ply that form an embodiment of the two dimensional unitary preform sheet that is convertible into a three dimensional preform. As may be seen the pattern of reinforcement plys vary between the layers, as well as the areas that are reinforced.

Figures 5A, 5B, 5C, 5D, 5E, 5F:
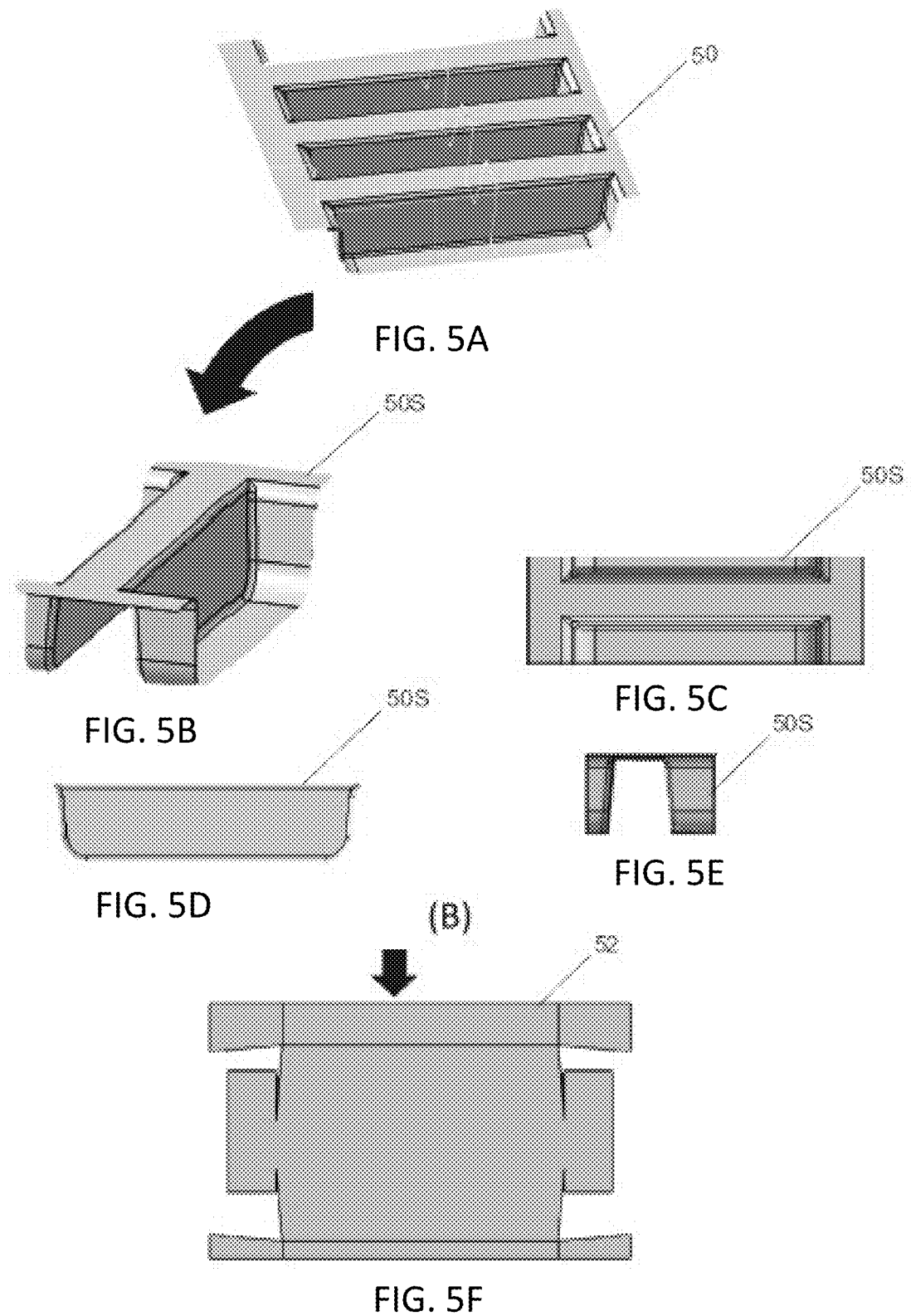
FIGS. 5A-5F are a series of views of a perspective view (FIG. 5A), a partial perspective view (FIG. 5B), a top view of FIG. 5B (FIG. 5C), a side view of FIG. 5B (FIG. 5D), a side view of FIG. 5B (FIG. 5E), breaking down a composite vehicle component to a set of individual parts that are each formed with an embodiment of the two dimensional unitary preform sheet (FIG. 5B)
Figure 6A:
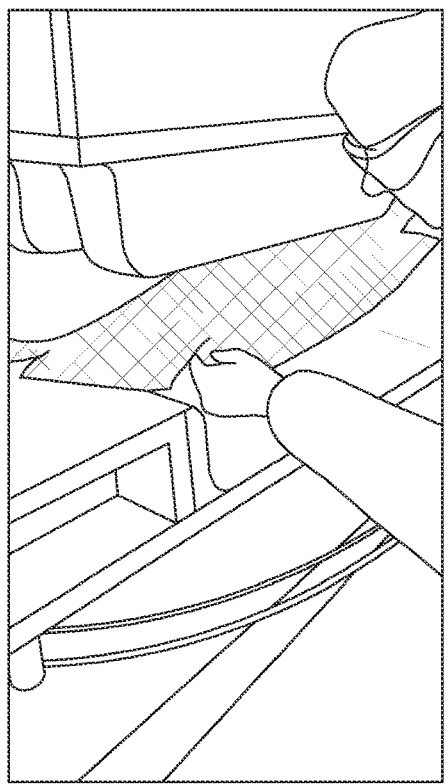
FIGS. 6A-6D illustrate the placement of an embodiment of a two dimensional unitary preform sheet in a press to form a three dimensional preform for use in a resin transfer molding or overmolding to form a three dimensional composite part.
Figure 6B:
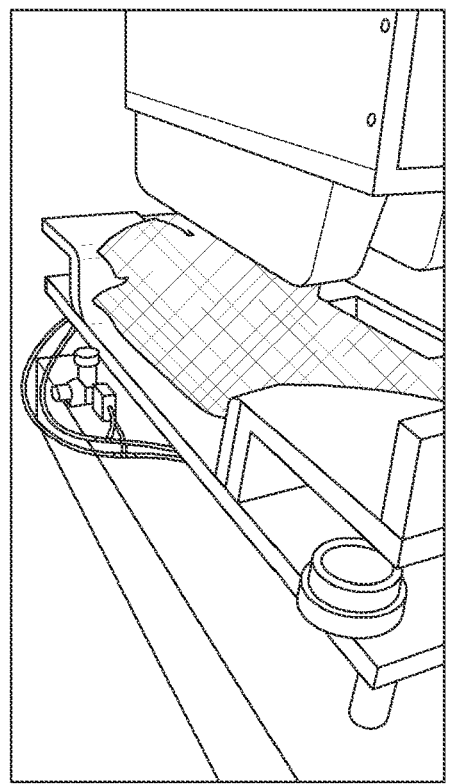
Figure 6C:
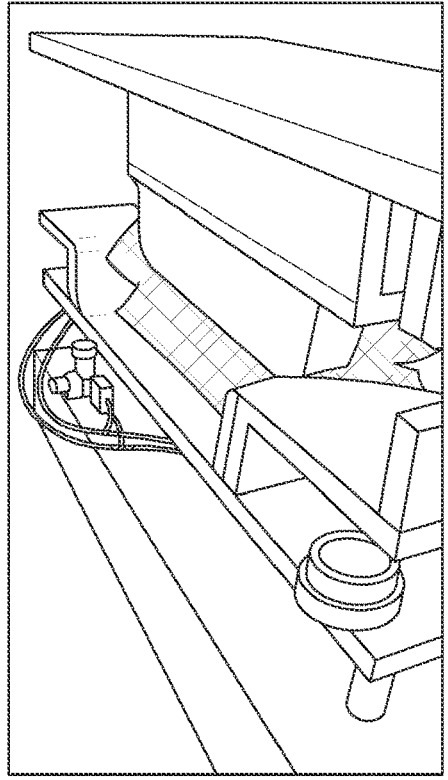
Figure 6D:
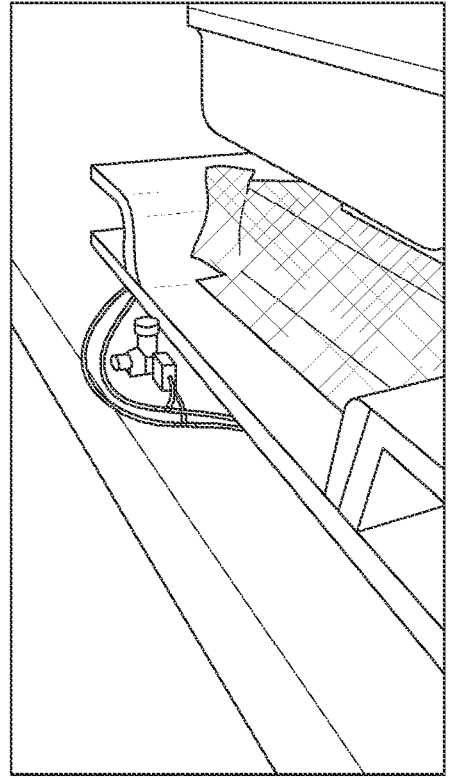
Figure 7A:
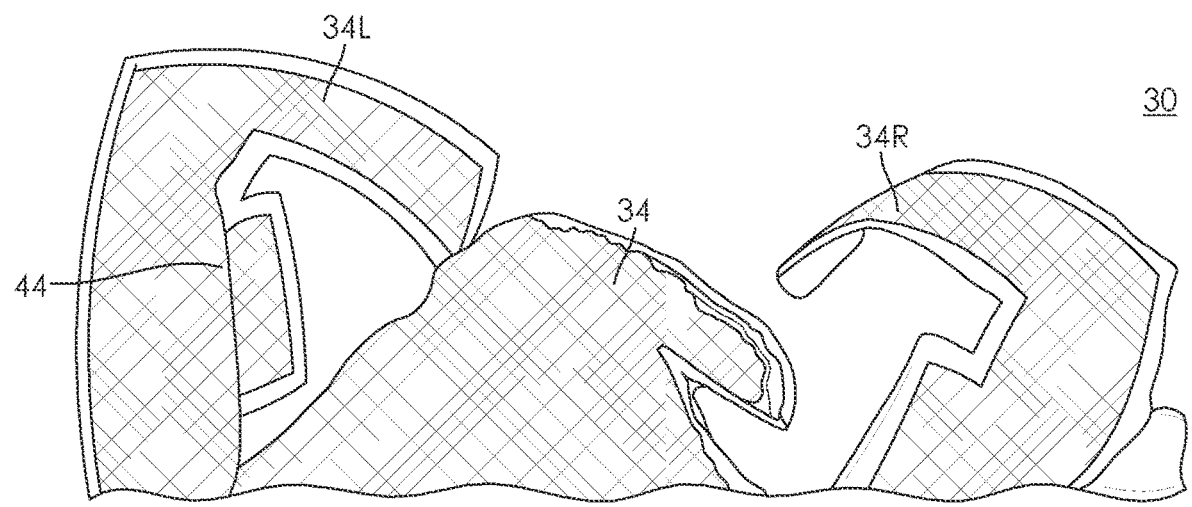
FIGS. 7A-7M are a series of views showing an embodiment of a two dimensional unitary preform formed using selective comingled fiber bundle positioning (SCFBP) or tailored fiber placement (TFP) being converted to a three dimensional preform for forming composite components.
Figure 7B:
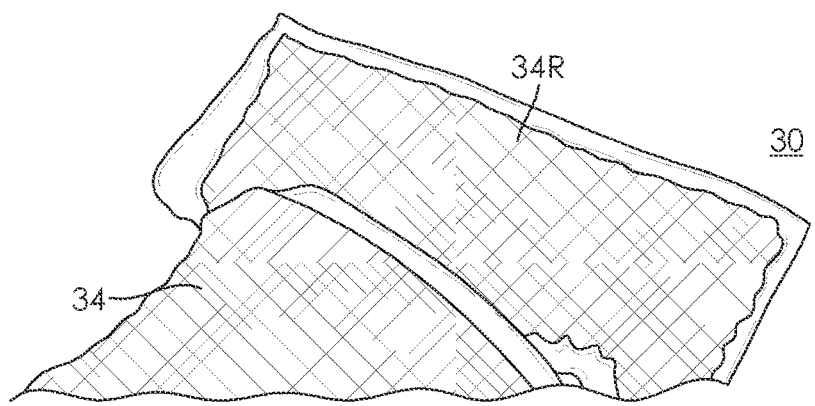
Figure 7C:
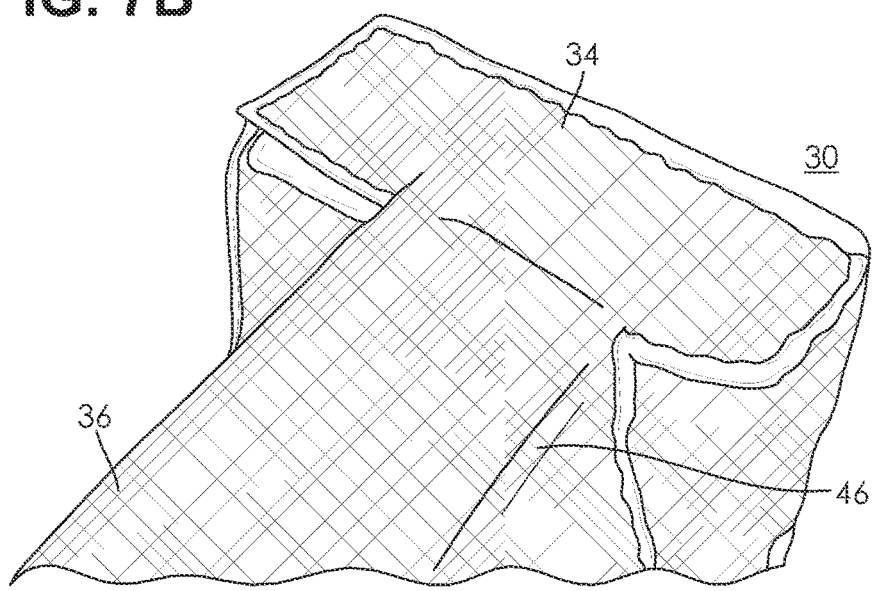
Figure 7D:
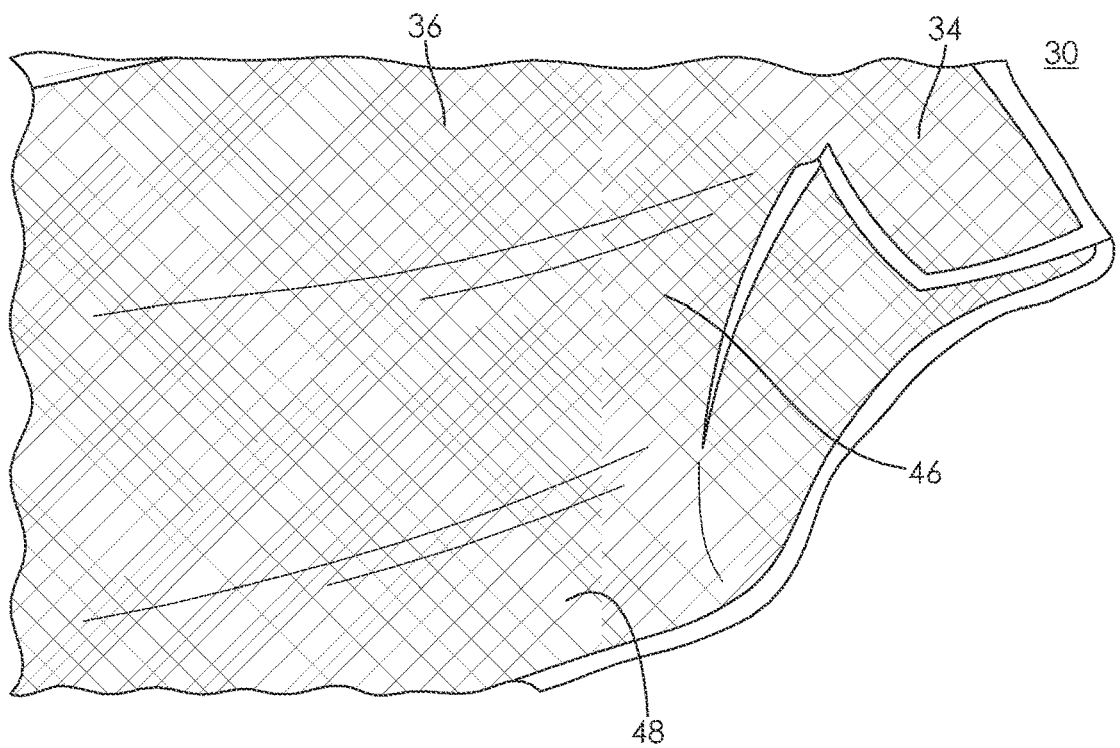
Figure 7E:
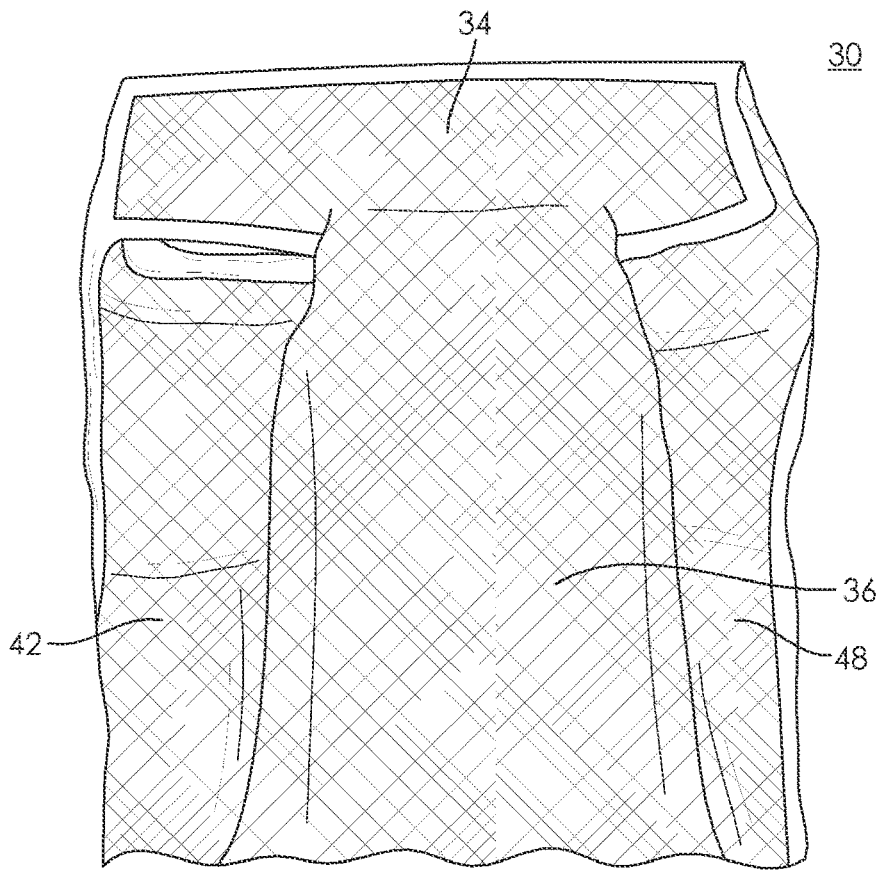
Figure 7F:
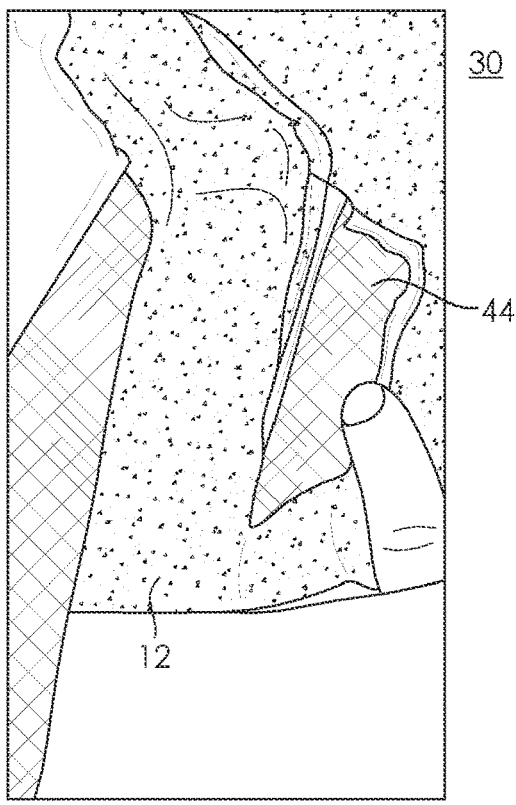
Figure 7G:
Figure 7H:
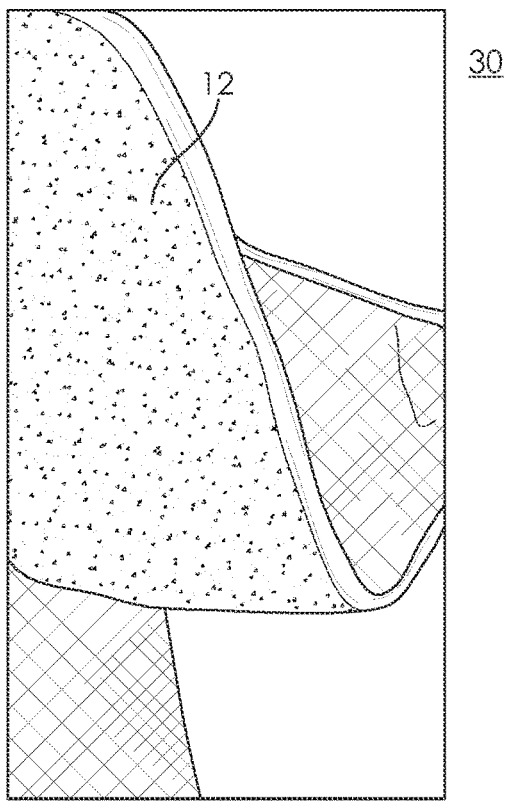
Figure 7I:
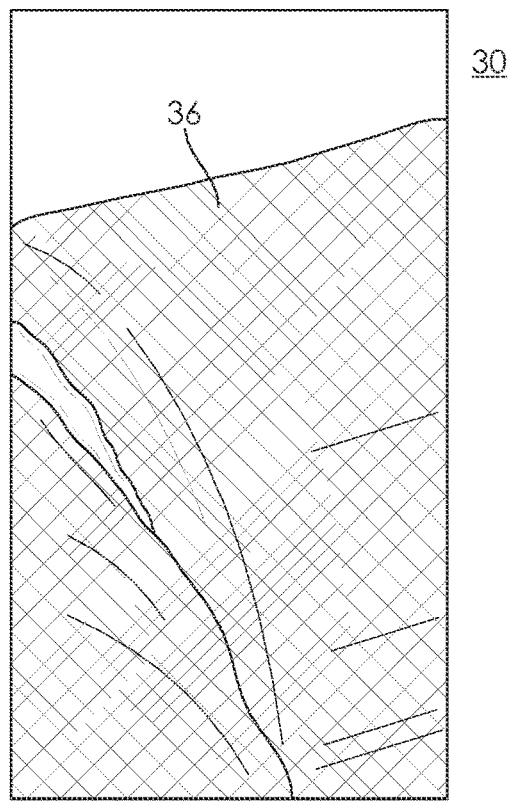
Figure 7J:
Figure 7K:
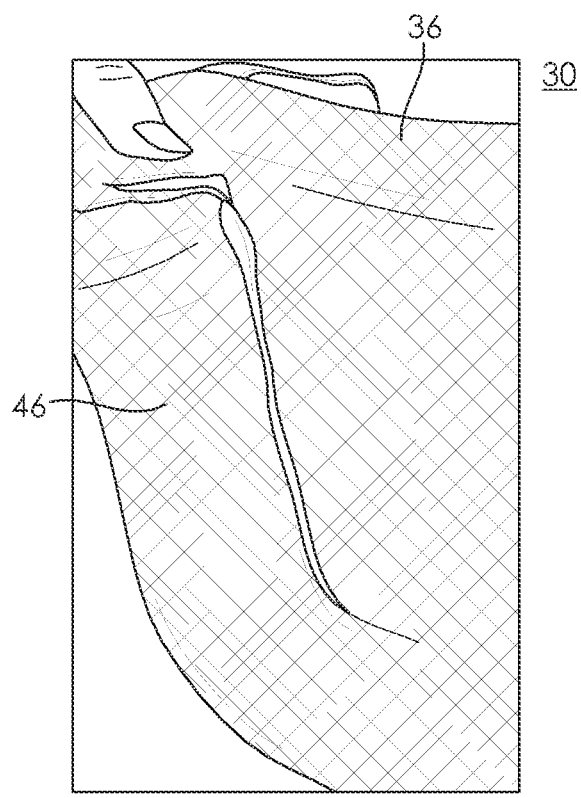
Figure 7L:
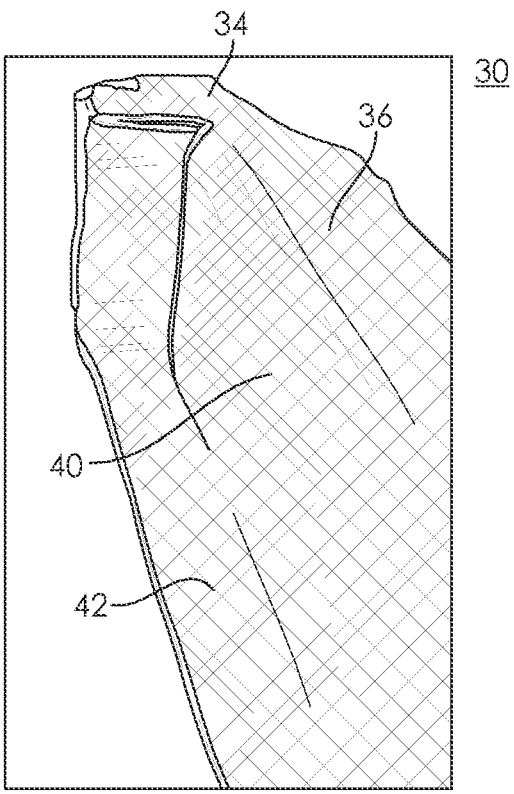
Figure 7M:
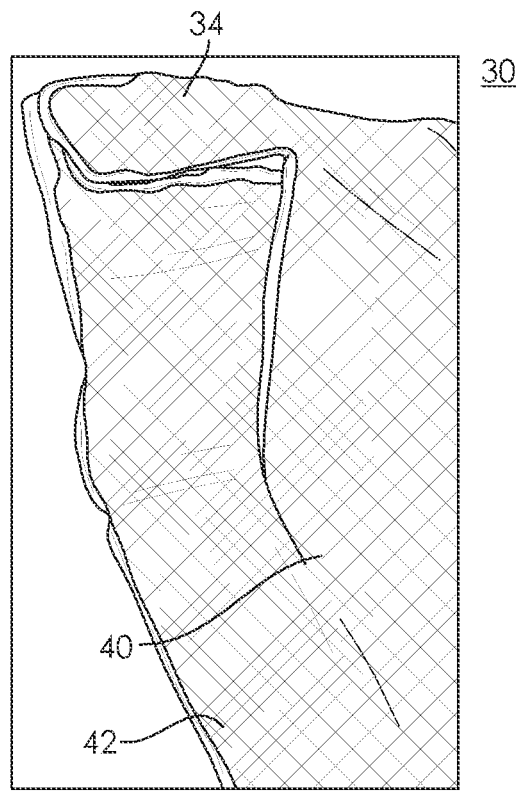

FIGS. 5A-5F are a series of views of a perspective view (FIG. 5A), a partial perspective view (FIG. 5B), a top view of FIG. 5B (FIG. 5C), a side view of FIG. 5B (FIG. 5D), a side view of FIG. 5B (FIG. 5E) in which a composite vehicle component 50 as shown in partial section 50S formed from a set of individual parts 52 that are each translated into a form of an embodiment of the two dimensional unitary preform sheet 52 (FIG. 5F). In the example shown, three of the two dimensional unitary preform sheets 52 would be placed together in an overmolding or RTM process to form the part 50.

FIGS. 6A-6D illustrate the placement of an embodiment of a two dimensional unitary preform sheet in a press to form a three dimensional preform for use in a resin transfer molding or overmolding to form a three dimensional composite part.

FIGS. 7A-7M are a series of views showing the two dimensional unitary preform 32 of FIG. 3 formed using selective comingled fiber bundle positioning (SCFBP) or tailored fiber placement (TFP) being converted to a three dimensional preform 30 for forming composite components. Corresponding features or areas of the preform are labeled with like numbers to indicate where a feature of the three dimensional preform 30 is found on the two dimensional unitary preform sheet 32. As is readily seen the carbon reinforcement is stitched to a substrate 12. Tabs 44 serve as attachment points as well as reinforcements for right angle bends. Areas of overlap such as 34, 34R, and 34L are extra reinforced areas for a composite part.

The foregoing description is illustrative of particular embodiments of the invention, but is not meant to be a limitation upon the practice thereof. The following claims, including all equivalents thereof, are intended to define the scope of the invention.

The invention claimed is:

1. A unitary preform sheet comprising:
a substrate defining a perimeter boundary;
a fiber bundle arranged on the substrate within the perimeter boundary and attached to the substrate by a plurality of stitches of a thread, the fiber bundle arranged in a shape that is a flat shape net of a folded three dimensional preform, wherein the unitary preform sheet includes at least two non-parallel cut edges adapted to contact one another within the perimeter boundary upon the flat shape net being laid on a complementary composite material mold resulting in the folded three dimensional preform.

2. The preform of claim 1 further comprising indicia on the preform indicating a location of a feature of the folded three dimensional preform.

3. The preform of claim 1 further comprising indicia on the preform indicating how to configure the unitary preform into the folded three dimensional preform.

4. The preform of claim 1 wherein the fiber bundle is arranged on and attached to the substrate using selective comingled fiber bundle positioning (SCFBP) or tailored fiber placement (TFP).

5. The preform of claim 1 wherein the fiber bundle comprises carbon fibers, glass fibers, aramid fibers, or a combination thereof.

6. The preform of claim 1 wherein the fiber bundle is arranged on the substrate in a curvilinear pattern.

7. The preform of claim 1 wherein the thread is a thermoplastic thread.

8. The preform of claim 1 wherein the thread is a thermoset material selected from the group consisting of: cellulose fibers, alkylated cellulose fibers, polyethersulphone, and rayon.

9. The preform of claim 1 further comprising a plurality of subsequent preform layers formed of the fiber bundle successively stacked from the first preform layer.

10. The preform of claim 9 wherein each successively stacked preform layer is arranged on a preceding layer and attached to the preceding preform layer by additional stitches of the thread.

11. The preform of claim 1 further comprising one or more tabs that are positioned at right angle folds.

12. The preform of claim 11 wherein the one or more tabs serve as attachment points for retaining a three-dimensional shape of the folded three dimensional preform.

13. A method for making a three dimensional preform, the method comprising:
   forming a unitary preform sheet having at least two non-parallel cut edges adapted to contact one another within a perimeter boundary of claim 1; and
   laying the unitary preform sheet on a complementary composite material mold placed in a press; and
   actuating the press to bend the unitary preform sheet into a shape of the folded three dimensional preform as defined by the complementary composite material mold.

14. The method of claim 13 further comprising providing indicia on the unitary preform sheet.

\* \* \* \* \*